United States Patent
Bian

(10) Patent No.: US 10,247,369 B2
(45) Date of Patent: Apr. 2, 2019

(54) MULTI-FUNCTIONAL RECHARGEABLE LIGHTING APPARATUS

(71) Applicant: Aixia Bian, Shanghai (CN)

(72) Inventor: Aixia Bian, Shanghai (CN)

( * ) Notice: Subject to any disclaimer, the term of this patent is extended or adjusted under 35 U.S.C. 154(b) by 0 days.

(21) Appl. No.: 15/640,700

(22) Filed: Jul. 3, 2017

(65) Prior Publication Data
US 2018/0231193 A1 Aug. 16, 2018

Related U.S. Application Data

(60) Provisional application No. 62/457,319, filed on Feb. 10, 2017.

(51) Int. Cl.
| | |
|---|---|
| *F21L 4/02* | (2006.01) |
| *F21V 17/10* | (2006.01) |
| *F21V 23/06* | (2006.01) |
| *F21V 21/08* | (2006.01) |
| *F21V 21/14* | (2006.01) |
| *F21V 29/89* | (2015.01) |
| *F21V 9/30* | (2018.01) |
| *B60Q 3/35* | (2017.01) |
| *B60Q 3/50* | (2017.01) |
| *F21V 23/04* | (2006.01) |
| *F21Y 115/10* | (2016.01) |
| *F21V 21/04* | (2006.01) |

(52) U.S. Cl.
CPC .................. *F21L 4/02* (2013.01); *B60Q 3/35* (2017.02); *B60Q 3/50* (2017.02); *F21V 9/30* (2018.02); *F21V 17/107* (2013.01); *F21V 21/08* (2013.01); *F21V 21/145* (2013.01); *F21V 23/06* (2013.01); *F21V 29/89* (2015.01); *F21V 21/04* (2013.01); *F21V 23/0414* (2013.01); *F21Y 2115/10* (2016.08)

(58) Field of Classification Search
CPC .. F21L 4/00; F21L 4/02; F21V 17/107; F21V 21/08; F21V 21/145; F21V 23/0414; F21V 23/06; F21V 9/30; B60Q 3/35
See application file for complete search history.

(56) References Cited

U.S. PATENT DOCUMENTS

| | | | | |
|---|---|---|---|---|
| 4,197,573 | A * | 4/1980 | Thatch | F21L 14/00 |
| | | | | 362/241 |
| 4,750,095 | A * | 6/1988 | Huang | F21V 23/0414 |
| | | | | 362/190 |
| 7,401,940 | B2 * | 7/2008 | Min | F21L 4/00 |
| | | | | 362/191 |
| 9,010,550 | B2 * | 4/2015 | Figueroa | F16M 13/022 |
| | | | | 211/105.1 |
| 2009/0251891 | A1 * | 10/2009 | Hong | F21L 4/027 |
| | | | | 362/183 |

(Continued)

*Primary Examiner* — Zheng Song
(74) *Attorney, Agent, or Firm* — Weisun Rao; Dennis P. Malloy; Greenberg Traurig, LLP

(57) ABSTRACT

A portable and rechargeable lighting apparatus includes an elongated housing having a radially-central cavity extending longitudinally along the elongated housing; one or more light emitting diodes (LEDs) affixed to a surface of the elongated housing and operable to emit light; one or more rods operable to extend coaxially from the radially-central cavity; one or more hooks coupled to distal ends of the respective one or more rods; and a battery operable to power the one or more LEDs.

16 Claims, 12 Drawing Sheets

(56) References Cited

U.S. PATENT DOCUMENTS

| | | | |
|---|---|---|---|
| 2012/0182749 A1* | 7/2012 | MacGregor | F21L 14/02 362/486 |
| 2013/0077296 A1* | 3/2013 | Goeckel | F21V 7/00 362/217.07 |
| 2013/0200020 A1* | 8/2013 | Wollert | F16M 11/041 211/70.6 |
| 2018/0202617 A1* | 7/2018 | Zhu | F21L 4/00 |

* cited by examiner

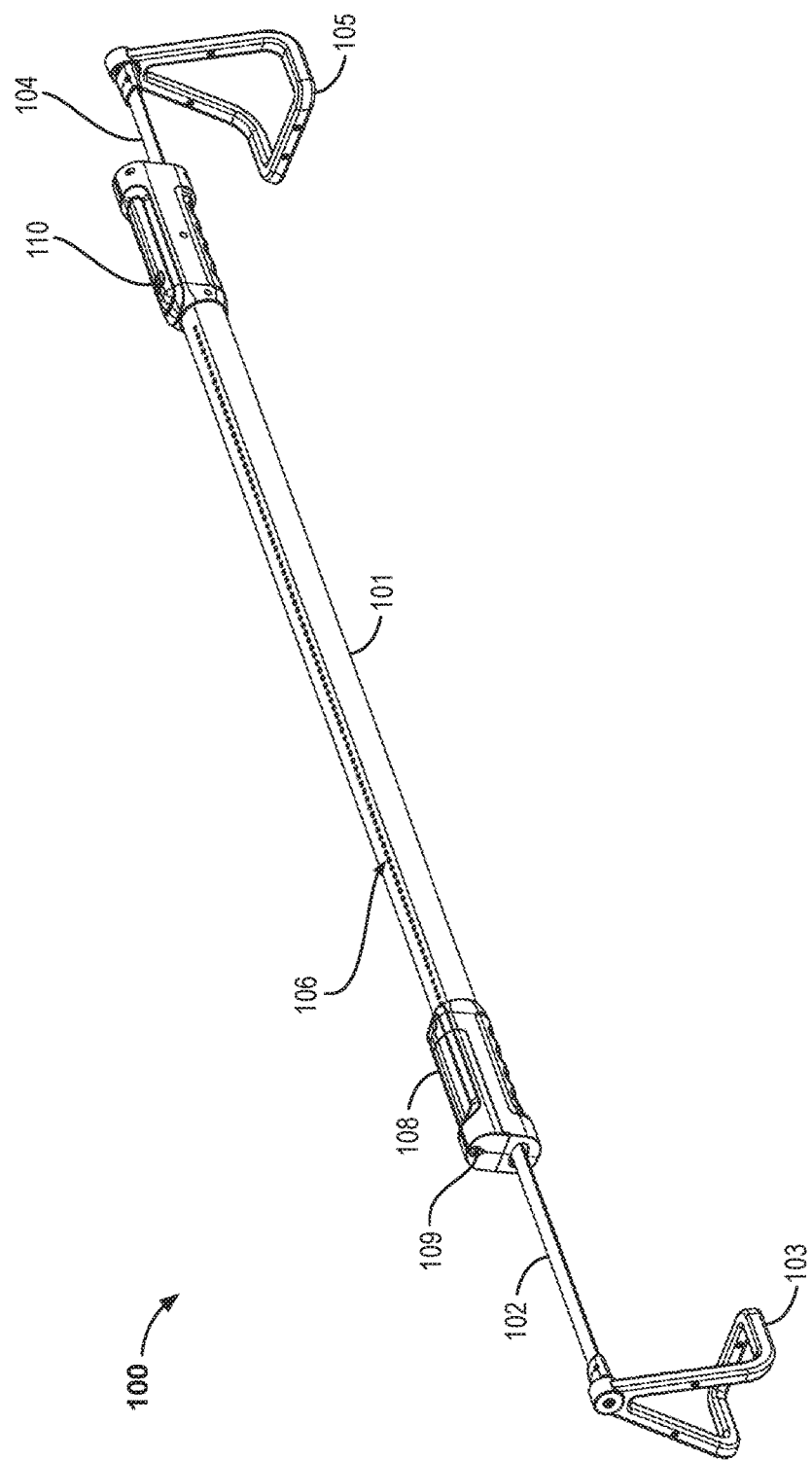

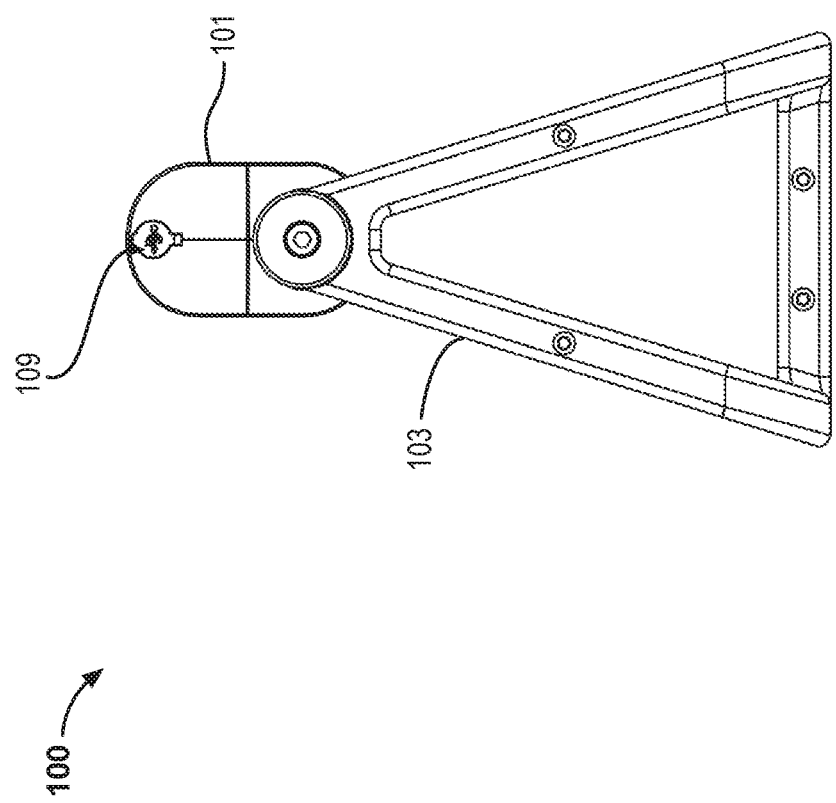

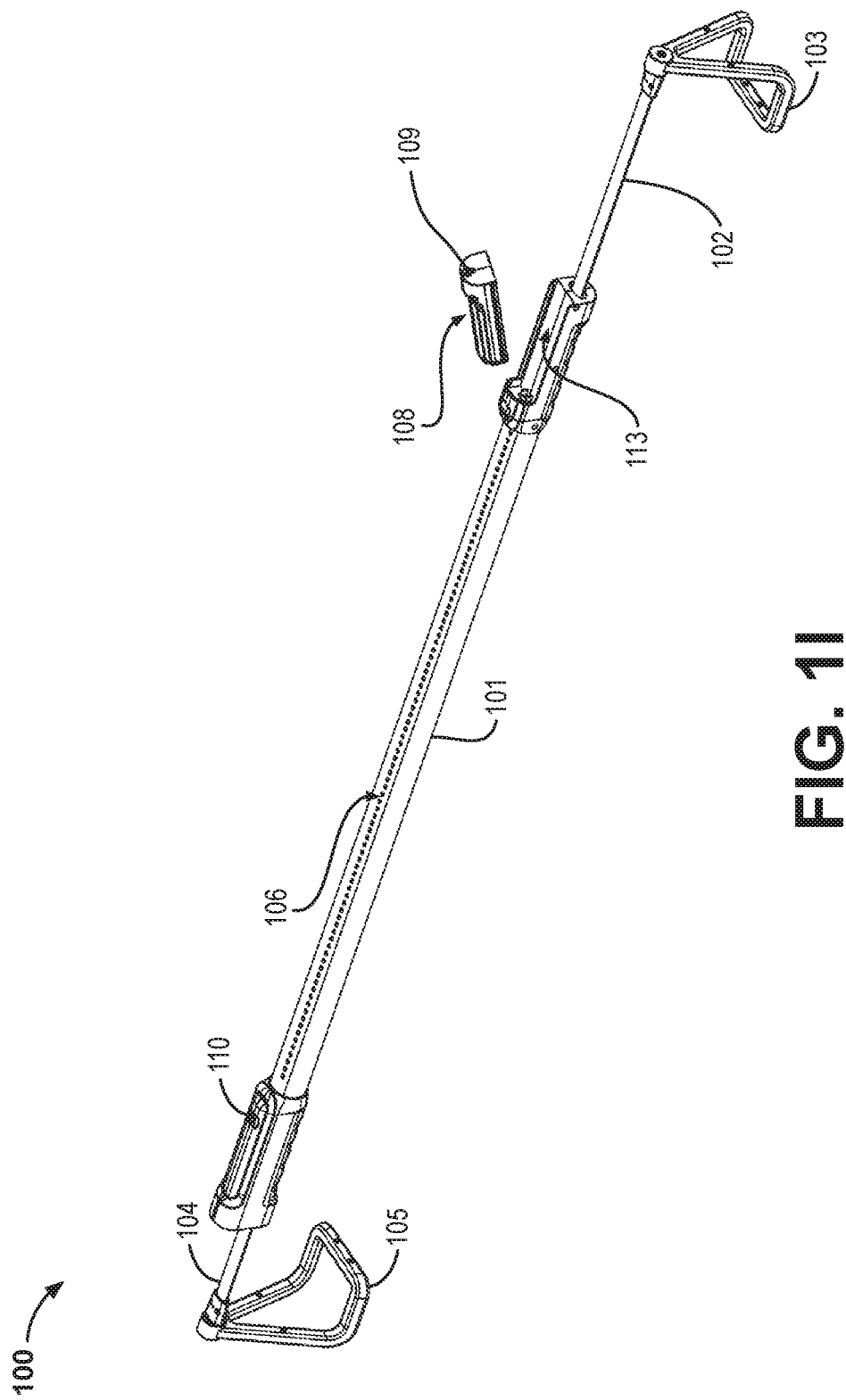

MULTI-FUNCTIONAL RECHARGEABLE LIGHTING APPARATUS

CROSS REFERENCE TO RELATED APPLICATION

This application is a non-provisional application claiming priority from U.S. Application No. 62/457,319, filed on Feb. 10, 2017, entitled "MULTI-FUNCTIONAL RECHARGEABLE LIGHTING APPARATUS" and incorporated herein by reference in its entirety.

BACKGROUND OF THE INVENTION

Advances in technology have enabled lighting devices to become increasingly lightweight and portable. Light emitting diodes (LEDs) are capable of efficiently converting electrical energy into light with little waste heat, allowing them to provide extended illumination with portable energy sources, such as batteries.

Environmental or ambient lighting may provide insufficient illumination, in some conditions or circumstances. For example, typical ceiling lamps or standing work lights may not adequately illuminate the engine bay of an automobile. It is accordingly an objective of the present invention to provide lighting apparatuses configured for or adapted to illuminate otherwise dimly lit regions.

Lighting apparatuses that illuminate otherwise dimly lit regions may be portable and rely upon stored energy in a capacitor or battery in order to power light sources thereon. Single-use disposable batteries may be convenient in some applications, but requires the user to maintain a supply of backup batteries to replace the drained single-use batteries. Additionally, swapping out dead batteries for new batteries requires a lighting device to be shut off, which can be inconvenient. It is accordingly another objective of the present invention to provide lighting apparatuses configured with rechargeable energy storage devices.

SUMMARY OF THE INVENTION

One aspect of the present invention relates to a portable lighting apparatus. The portable lighting apparatus includes an elongated housing having a radially-central cavity extending longitudinally along the elongated housing, one or more light emitting diodes (LEDs) affixed to a surface of the elongated housing and operable to emit light, one or more rods operable to extend coaxially from the radially-central cavity, one or more hooks coupled to distal ends of the respective one or more rods, and a battery operable to power the one or more LEDs.

In some embodiments, the portable lighting apparatus further includes a charging port operable to receive power from a power source, wherein the charging port is configured to supply power to the battery.

In some other embodiments, the portable lighting apparatus further includes a photoluminescent coating covering at least a portion of the surface of the elongated housing, wherein the photoluminscent coating is adapted to emit light for a duration of time after being irradiated by a light source.

In some embodiments of the portable lighting apparatus, the elongated housing includes a receptacle, and the portable lighting apparatus would further include a foldable lighting apparatus configured to be removably coupled to the receptacle. In some further embodiments, the portable lighting apparatus includes a base member; a rotatable member coupled to the base member via a hinge; and at least one LED mounted on a surface of the rotatable member. In still some further embodiments, the foldable lighting apparatus includes a photoluminescent coating covering at least a portion of the surface of the rotatable member, wherein the photoluminscent coating is adapted to emit light for a duration of time after being irradiated by a light source. In these embodiments, the battery can be a first battery, and the foldable lighting apparatus further includes a second battery operable to power the at least one LED mounted on the surface of the rotatable member.

In some embodiments, the portable lighting apparatus further includes a button situated on a surface of the base member, wherein the button selectively energizes the at least one LED. In these embodiments, the receptacle includes one or more first power terminals, wherein the foldable lighting apparatus further includes one or more second power terminals that are electrically coupled with the one or more first power terminals when the foldable lighting apparatus is coupled to the receptacle, and wherein the second battery is adapted to receive power when the foldable lighting apparatus is coupled to the receptacle.

In some embodiments, the surface of the rotatable member is a first surface, wherein the first surface is at an end of the rotatable member opposite to the hinge, wherein the at least one LED is a first LED, and the foldable lighting apparatus further includes a second LED mounted on a second surface of the rotatable member. In these embodiments, the foldable lighting apparatus may further include a photoluminescent coating covering at least a portion of the second surface of the rotatable member, wherein the photoluminscent coating is adapted to emit light for a duration of time after being irradiated by a light source.

In some embodiments, the portable lighting apparatus further includes one or more depressions on one or more respective surfaces of the base member.

In some embodiments, the rotatable member of the foldable lighting apparatus is formed from metal and adapted to dissipate heat produced by the at least one LED.

In some embodiments of the portable lighting apparatus, each of the one or more hooks is substantially triangular in shape.

In some embodiments of the portable lighting apparatus, each of the one or more hooks is rotatably coupled to the respective one or more rods.

In some embodiments of the portable lighting apparatus, each of the one or more hooks is detachably coupled to the respective one or more rods.

In some embodiments of the portable lighting apparatus, the one or more LEDs are surface mount device (SMD) LEDs.

In some embodiments of the portable lighting apparatus, the one or more LEDs are chips on board (COB) LEDs.

In another aspect, the present invention provides a foldable lighting apparatus adapted to be removably coupleable with a receptacle on a portable lighting apparatus. The foldable lighting apparatus includes a base member, a rotatable member coupled to the base member via a hinge, at least one LED mounted on a surface of the rotatable member, and a photoluminescent coating covering at least a portion of the surface of the rotatable member. The photoluminscent coating is adapted to emit light for a duration of time after being irradiated by a light source, such as ambient light, environmental light, or light emitted by the at least one LED.

In yet another aspect, the present invention provides portable lighting apparatus which includes: an elongated housing having a radially-central cavity extending longitudinally along the elongated housing; one or more light emitting diodes (LEDs) affixed to a surface of the elongated housing and operable to emit light; one or more rods operable to extend coaxially from the radially-central cavity; one or more hooks detachably coupled to distal ends of the respective one or more rods, wherein the one or more hooks are rotatable with respect to the respective one or more rods; a battery operable to power the one or more LEDs; a receptacle on the elongated housing; and a foldable lighting apparatus adapted to removably couple with the receptacle, wherein the foldable lighting apparatus includes a base member, a rotatable member coupled to the base member via a hinge, and at least one LED mounted on a surface of the rotatable member.

The foregoing summary is illustrative only and is not intended to be in any way limiting. In addition to the illustrative aspects, embodiments, and features described above, further aspects embodiments, and features will become apparent by reference to the figures and the following detailed description and the accompanying drawings.

BRIEF DESCRIPTIONS OF THE DRAWINGS

FIG. 1A is a perspective view of a rechargeable multi-functional lighting apparatus, according to an example embodiment.

FIG. 1G is a side view of a rechargeable multi-functional lighting apparatus, according to an example embodiment.

FIG. 1I is a perspective view of a rechargeable multi-functional lighting apparatus with a decoupled portable foldable lighting apparatus, according to an example embodiment.

DETAILED DESCRIPTION OF THE INVENTION

Figure 1B:
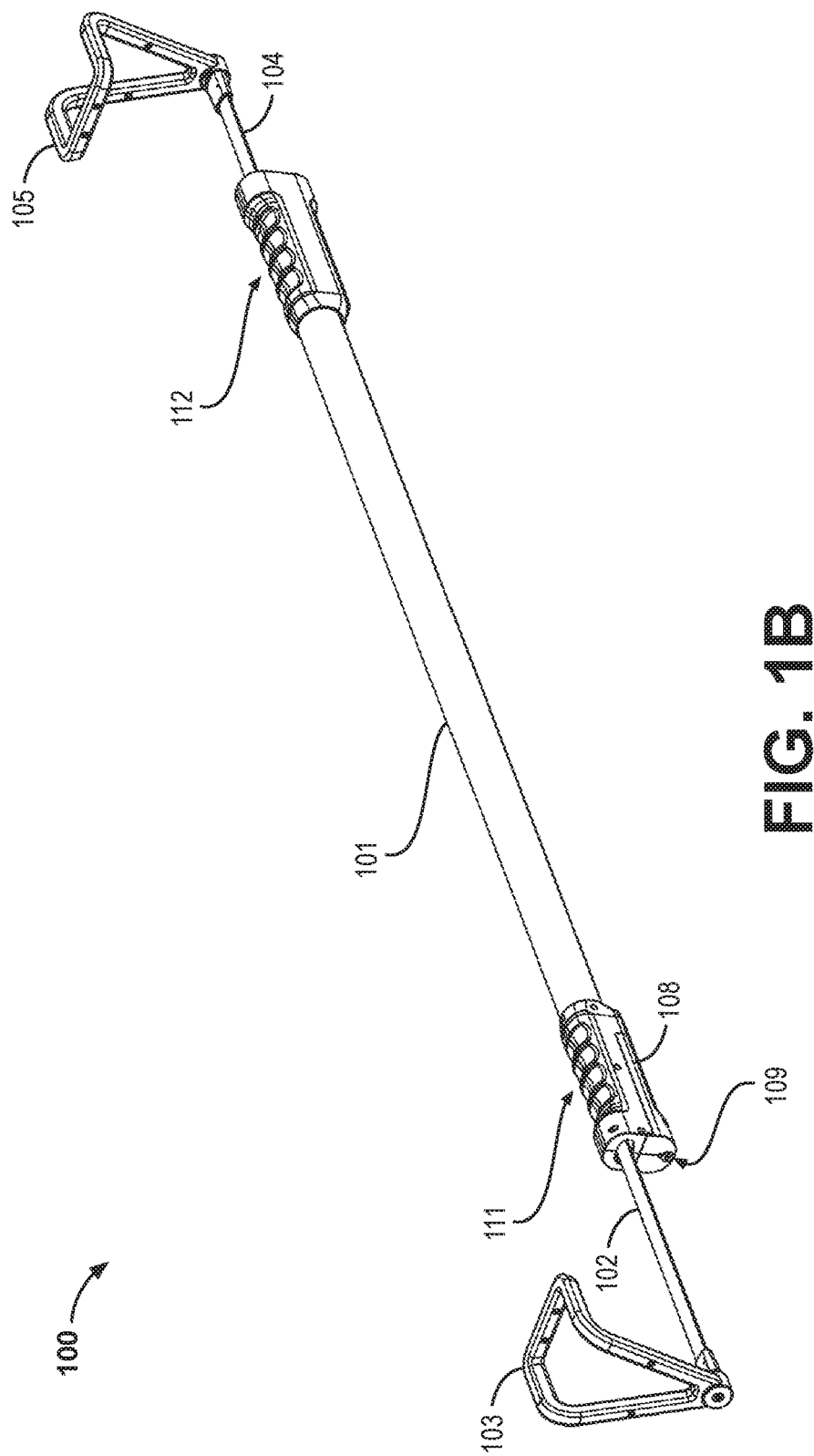
FIG. 1B is a perspective view of a rechargeable multi-functional lighting apparatus, according to an example embodiment.
Figure 1C:
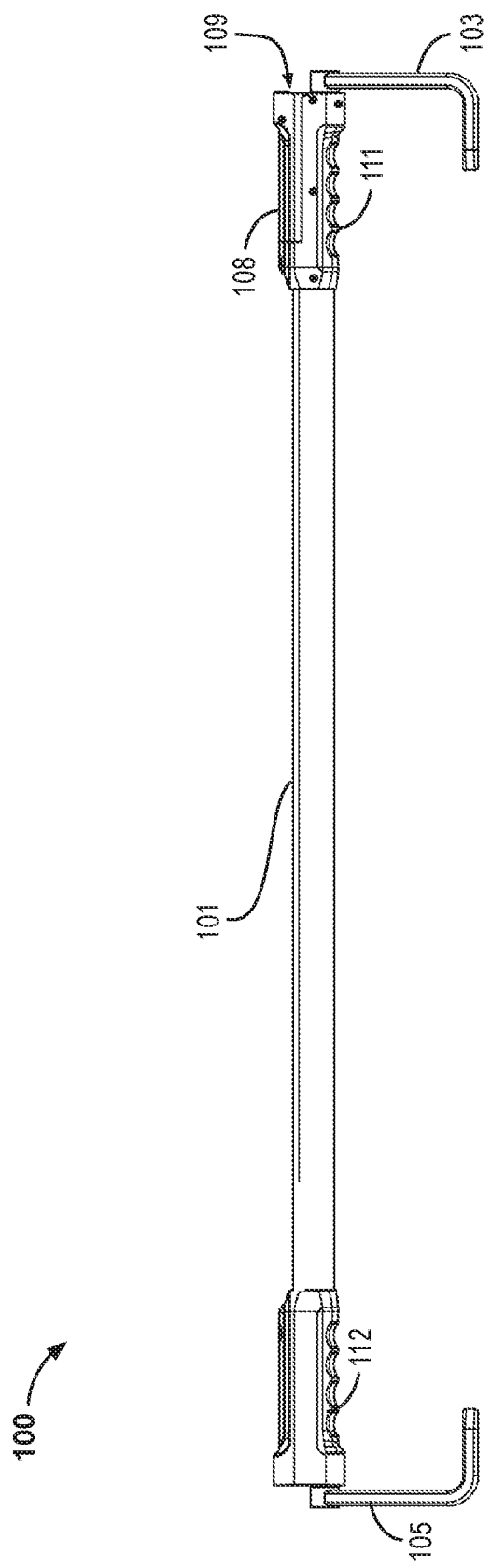
FIG. 1C is a front view of a rechargeable multi-functional lighting apparatus, according to an example embodiment.
Figure 1D:
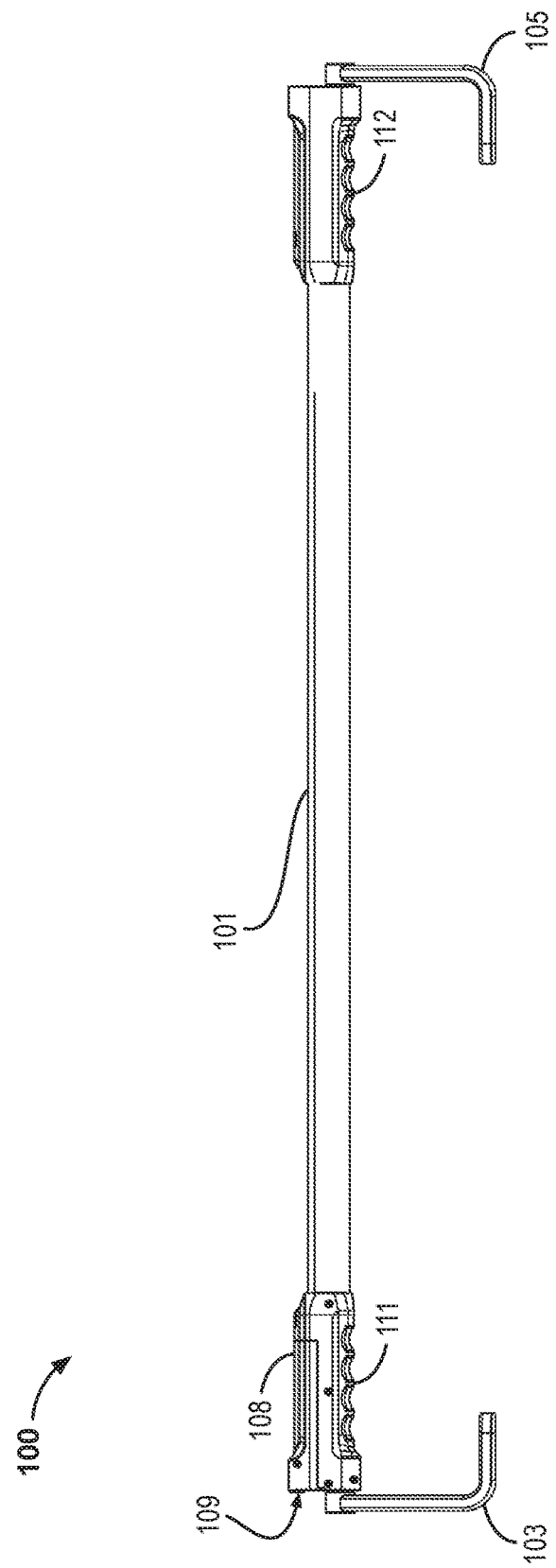
FIG. 1D is a back view of a rechargeable multi-functional lighting apparatus, according to an example embodiment.
Figure 1E:
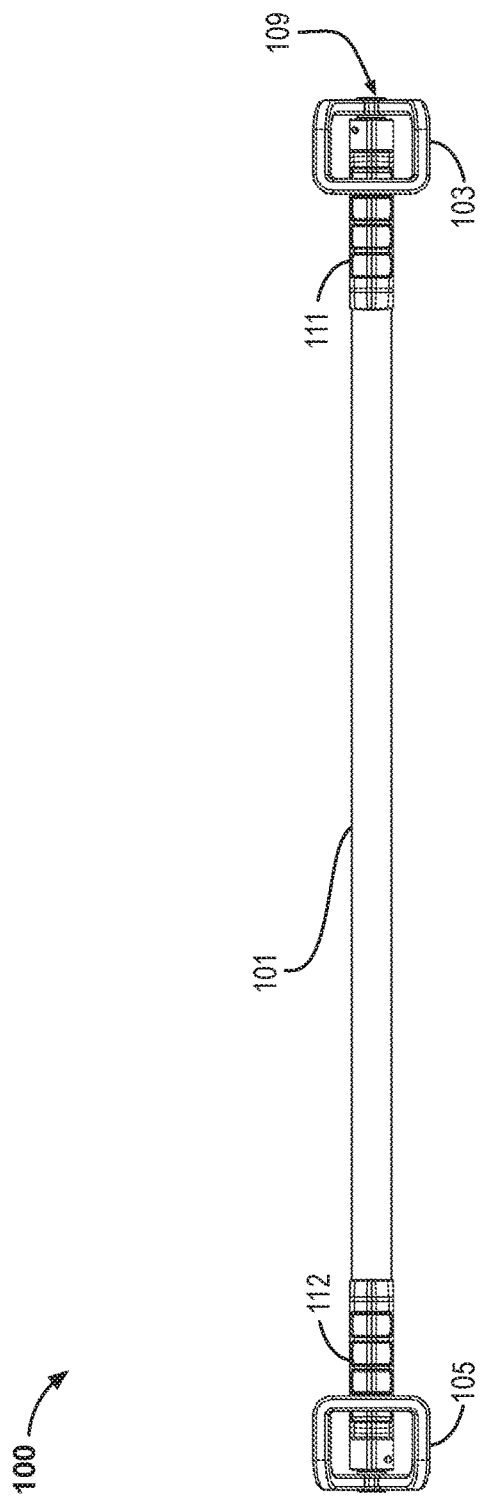
FIG. 1E is a bottom-up view of a rechargeable multi-functional lighting apparatus, according to an example embodiment.
Figure 1F:
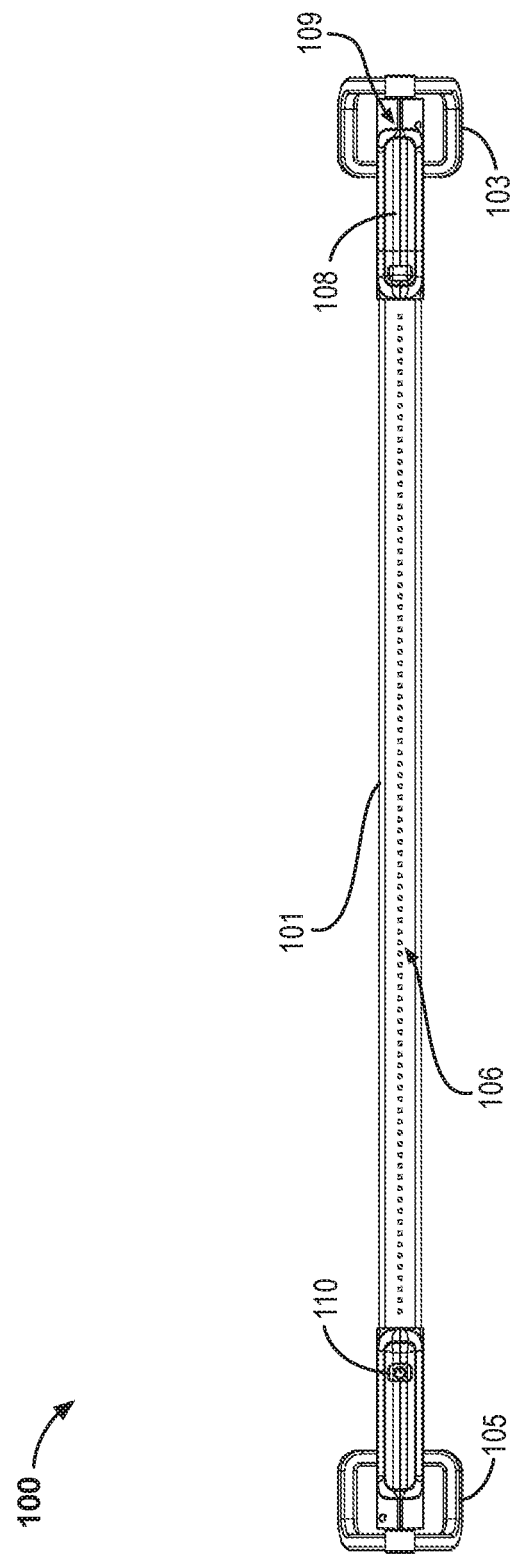
FIG. 1F is a top-down view of a rechargeable multi-functional lighting apparatus, according to an example embodiment.
Figure 1H:
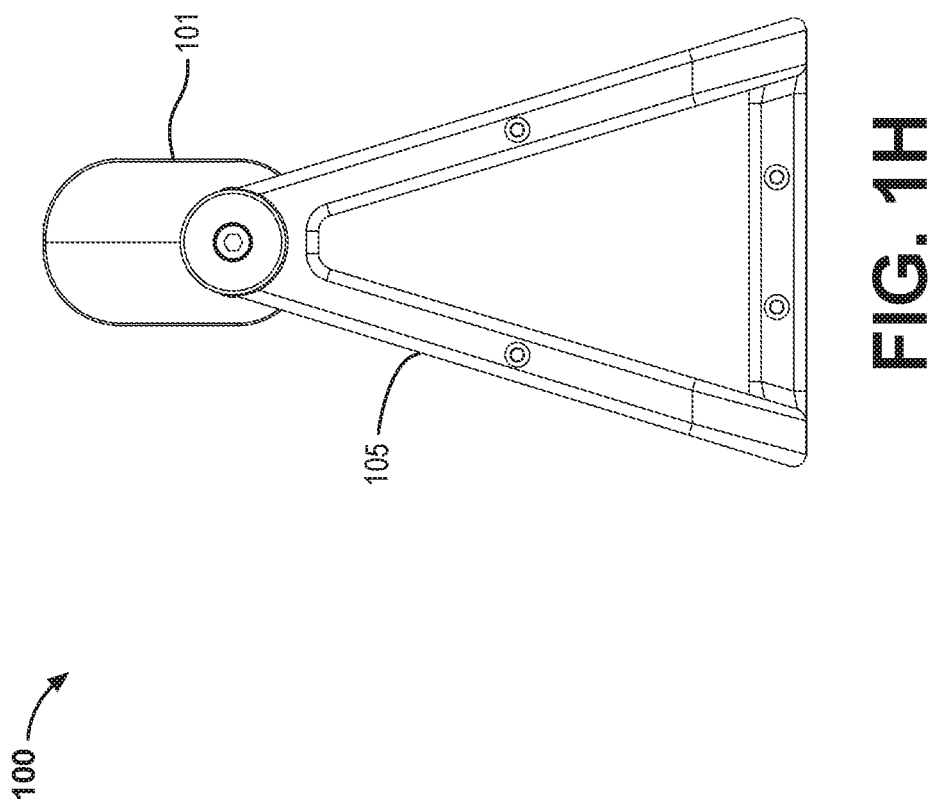
FIG. 1H is a side view of a rechargeable multi-functional lighting apparatus, according to an example embodiment.

The following description of example methods and apparatus is not intended to limit the scope of the description to the precise form or forms detailed herein. Instead the following description is intended to be illustrative so that others may follow its teachings.

The present application discloses multi-functional lighting apparatuses. An example lighting apparatus includes an elongated housing with one or more central cavities at the distal and proximal ends of the housing. A surface of the elongated housing has mounted thereon one or more LEDs, which are operable to project light outward from the surface. The lighting apparatus also includes rods capable of extending coaxially from the ends of the housing. Extending or retracting the rods allows the overall length of the multi-functional lighting apparatus to be adjusted. Hooks are coupled to the distal ends of the rods, allowing the lighting apparatus to be mounted or hung.

A portion of the surface on which the one or more LEDs are mounted may be coated with a photoluminescent (e.g., fluorescent or phosphorescent) substance that absorbs light—either from the environment and/or from the one or more LEDs—that glows for a duration of time after being removed from the bright environment and/or after the LEDs have been turned off. The light emitted from the photoluminescent substance, although dimmer than the LED light, allows the lighting apparatus to be located in dark environments.

The example multi-functional lighting apparatus also includes a charging port on a surface of the elongated body, into which a power connector can be inserted. In some embodiments, the charging port supplies power for charging one or more batteries or other energy storage elements embedded within the housing. Such a charging system enables the multi-functional lighting apparatus to be portable and used for a period of time without needing to be directly connected to an electrical socket.

The example multi-functional lighting apparatus further includes a removable foldable lighting apparatus that can secured into a receptacle on the housing. The foldable lighting apparatus includes its own separate battery that is charged using power input from the charging port, allowing the foldable lighting apparatus to be removed from the receptacle and serve as a portable handheld flashlight. Like the multi-functional lighting apparatus, the foldable lighting apparatus includes one or more LEDs surrounded by photoluminescent material.

In an example scenario, a mechanic is servicing an automobile engine in a dark or inadequately lit environment. Due to the poor lighting conditions, it is difficult for the mechanic to see the components in the engine bay. The mechanic then locates the multi-functional lighting apparatus from the glow of its photoluminescent surface. Using the example multi-functional lighting apparatus, the mechanic adjusts the length of the rods and orients the hooks so that the lighting apparatus can be hung from the underside of the elevated car hood. By pointing the LEDs downward, the mechanic can illuminate the engine bay, without having to hold a flashlight in one hand while working. If a region within the engine bay is obscured by other engine components, the mechanic can remove the foldable lighting apparatus from the receptacle and manually orient it to illuminate the otherwise dark region.

FIGS. 1A-1I illustrate various perspective views of an example multi-functional lighting apparatus. Although the following description relates to this specific example, the present application encompasses other lighting apparatus configurations. The specific arrangement of elements may vary among different embodiments without departing from the scope of the present disclosure.

Referring now to FIG. 1A, a multi-functional lighting apparatus 100 includes an elongated housing 101 with rods 102 and 104 extending coaxially from the ends of the elongated housing 101. A surface of the elongated housing 101 includes an illuminated region with LEDs 106 and photoluminscent material surrounding LEDs 106. The elongated housing 101 includes a receptacle 113 in which removable lighting apparatus 108 can be removably secured. An end of the housing has thereon a charging port 109 into which a charging cable can be removably secured. The charging port 109 may serve to supply power to the LEDs 106 and removable lighting apparatus 108, and to charge any batteries or other energy storage elements included within the multi-functional lighting apparatus 100 and/or removable lighting apparatus 108.

The elongated housing 101 may be constructed from a variety of materials, including plastics and metals. In some examples, the elongated housing 101 is constructed from aluminum to be lightweight, dissipate waste heat produced by the LEDs or resistive components that drive or limit current to the LEDs, and to provide durability against impacts or other physical stresses. The elongated housing 101 may, in some embodiments, be circumferentially rotatable with respect to the rods 102 and 104, such that the surface on which the LEDs 106 are mounted can be oriented to illuminate in different directions. The angle of illumination of the LEDs 106 may be defined by the type and shape of the LEDs 106.

Rods 102 and 104 may be any kind of elongated member that fits within respective cavities of the elongated housing 101. In some examples, the rods 102 and 104 may friction fit within the housing, such that the rods 102 and 104 are resistant to coaxial movement. The rods 102 and 104 may also be coupled to additional mechanisms, such as a spring or other retention feature, which resists coaxial motion in the distal direction (and also causes the rods to exert a coaxial proximal force, allowing the hooks to grip onto objects). The rods 102 and 104 may be constructed from plastics or metals, among other materials. Additionally, the shape of rods 102 and 104 may be substantially cylindrical, such that the elongated housing 101 can rotate 360° circumferentially.

Rods 102 and 104 may include features or elements that engage with respective features or elements within the central cavity of the elongated housing 101. For example, rods 102 and 104 may include protrusions near the proximal end of rods 102 and 104 which are interference or friction fit with slots or depressions within the elongated housing 101, thereby enabling rods 102 and 104 to be movable under some amount of force, but otherwise stationary to maintain a particular length.

Rods 102 and 104 may be independently movable, such that rod 102 may be extended by a first amount, while rod 104 is extended by a different amount. Such independent movability may permit the multifunctional lighting apparatus 100 to be hooked or attached to an object, while selectively placing the light more to one side than the other. For example, if multifunctional lighting apparatus 100 is hooked on the underside of the hood of an automobile, one of rods 102 and 104 may be extended more than the other to place the LEDs 106 over a specific portion of the engine bay, rather than being centered over the engine bay.

Hooks 103 and 105 are coupled to rods 102 and 104, respectively. In some embodiments, hooks 103 and 105 are curved or angled features at the distal ends of rods 102 and 104. In other embodiments, hooks 103 and 105 are separate elements coupled to the distal ends of rods 102 and 104. The hooks 103 and 105 may be removably coupled to the rods 102 and 104, allowing the hooks 103 and 105 to be removed and replaced with other hooks. In some embodiments, the hooks 103 and 105 may be rotatably coupled to the distal ends of rods 102 and 104, such that the elongated housing 101 and LEDs 106 mounted thereon can be oriented without rotating rods 102 and 104; such rotatably coupled hooks 103 and 105 allow for implementations with rods 102 and 104 having non-symmetrical shapes.

As shown in the figures, hooks 103 and 105 may be triangularly shaped and bent at across two edges of the triangle. However, other hook shapes are possible without departing from the scope of the present disclosure.

As shown in the figures, hooks 103 and 105 may include a combination of materials therein, such as metals, plastics, silicone, and rubber, among other materials. Hooks 103 and 105 may be formed from a rigid material that is covered or surrounded by silicone or rubber to enhance the grip of hooks 103 and 105. Regardless of the particular implementation, hooks 103 and 105 may be formed from a material or coated with a substance to increase the friction between hooks 103 and 105 with surfaces with which hooks 103 and 105 engage.

LEDs 106 may be surface mounted device (SMD) LEDs arranged substantially linearly along a surface of the elongated housing 101. The LEDs 106 may be of any type, shape, color, or size, depending on the particular implementation. The multi-functional lighting apparatus 100 may also include additional circuit elements for limiting the current supplied to the LEDs, circuitry for driving the LEDs, components for dissipating heat from the LEDs, circuit elements for charging batteries or capacitors that power the LEDs, and/or any other electronic or circuit components to facilitate the powering and/or charging of the multi-functional lighting apparatus 100.

LEDs 106 may include any combination of LED types and/or colors. In some instances, it may be desirable to have a particular LED color (or combination of colors) to accomplish a certain illumination goal. For example, it may be preferable to use white LEDs (i.e., light emitting diodes with a phosphor coating that is excited by monochromatic light to produce a spectrum of wavelengths) to achieve a broad spectrum of absorption. As another example, it may be desirable to use ultra-violet (UV) LEDs, to excite fluorescent dyes or otherwise illuminate UV-reactive substances. One of ordinary skill would appreciate the benefits of using different LED colors in various applications.

The charging port 109 may be coupleable to a charging cable (not shown) and supply either AC or DC power to the multi-functional lighting apparatus 100. In some examples, the multi-functional lighting apparatus 100 includes DC batteries (e.g., lithium ion) that can charge off a DC power supply. In other examples, the multi-functional lighting apparatus 100 may include circuitry for converting AC power into DC power, such that an AC current can be supplied to the multi-functional lighting apparatus 100 for powering the LEDs 106 and/or any batteries included therein.

The multi-functional lighting apparatus may also include a power switch 110 that controls the operation of LEDs 106. The power switch 110 may be a button that can be operably placed into multiple positions, such as an on and off positions.

In some examples, the elongated housing 101 also includes grips 112 and 111, which may include a set of groves that assist a user in holding or positioning the multi-functional lighting apparatus 100. The grips 112 and 111 may be plastic, rubber, or silicone elements affixed to the elongated housing 101.

A removable lighting apparatus 108 may be removably secured into receptacle 113, as shown in FIG. 1I. The receptacle 113 might have a geometric shape that allows the removable lighting apparatus 108 to be friction fit or clasped into the receptacle 113. The receptacle 113 may also include conductive elements that provide power to corresponding terminals on the removable lighting apparatus 108, allowing the removable lighting apparatus 108 to charge while seated within the receptacle 113. The removable lighting apparatus 108 may include LEDs 120 mounted thereon that, when in the closed configuration and secured into receptacle 113, point outward so as to provide illumination in the same direction as LEDs 106. The removable lighting apparatus 108 may also, when secured in receptacle 113, be controlled by the same power switches or other control mechanisms that turn the LEDs 106 on and off. The mechanism securing the removable lighting apparatus 108 into receptacle 113 may be strong enough to keep the removable lighting apparatus 108 in place, even while the removable lighting apparatus 108 is pointing downward.

In some embodiments, the removable lighting apparatus 108 serves as both a separate lighting device from the LEDs 106, and as a battery for powering LEDs 106 while seated within the receptacle 113. The battery within the removable lighting apparatus 108 may provide power for energizing LEDs 106, like a removable battery pack. The removable lighting apparatus 108 may be charged while separated from the multi-functional lighting apparatus 100, so as to be replaceable in the event that the multi-functional lighting apparatus 100 is low on its current battery power. Additionally, the removable lighting apparatus 108 may be detached from the receptacle 113 of the multi-functional lighting apparatus 100 and used as a handheld flashlight. In this manner, the removable lighting apparatus 108 is a hybrid tool that can be integrated within the multi-functional lighting apparatus 100 as a battery pack, or be detached from the multi-functional lighting apparatus 100 and used as a separate flashlight.

The removable lighting apparatus 108 includes a base 124 and a rotatable member connected to each other through hinge 123. The rotatable member may include LEDs 120 and a photoluminescent region 121 in a recessed portion of the rotatable member. On the end of the rotatable member opposite from the hinge 123, a light emitting region 122 is provided that includes one or more LEDs (e.g., high power SMD LEDs) surrounded by reflective or photoluminescent surfaces. The surface surrounding the LED(s) in light emitting region 122 may be shaped like a total reflection spotlight lens, and can be formed using a hot-melt technique. The rotatable member may include an aluminum housing for heat dissipation and impact resistance.

The LEDs 120 may be either SMD LEDs or chips on board (COB) LEDs. The COB LEDs may provide a continuous diffused light source that outputs a more even illumination compared to SMD LEDs. The photoluminescent region 121 may include fluorescent or phosphorescent substances that glow or otherwise emit light in addition to the LEDs 120. It should The base 124 may house electronics and/or batteries that drive the LEDs 120 and the light emitting region 122. The base 124 may also house other control elements to facilitate the charging batteries enclosed therein. The base 124 may also serve as a handle with which the removable lighting apparatus 108 can be handheld for portable usage. Recessed region(s) 125 can be included along the sides of the base 124 to enhance a user's grip on the base 124. The base 124 may also include thereon a button 126 (shown in FIG. 2B and FIG. 2C) for operating the removable lighting apparatus 108. In some instances, the button 126 may simply act as a momentary pushbutton that switches the removable lighting apparatus 108 between "on" and "off" states. In other instances, pressing button 126 may cycle between various modes of the device, such as only LEDs 120 on, only light emitting region 122 on, both LEDs 120 and light emitting region 122 on, and all LEDs off. In further instances, button 126 may affect other aspects of the removable lighting apparatus's operation, such as changing between brightness modes, blinking modes, etc.

Figure 2A:
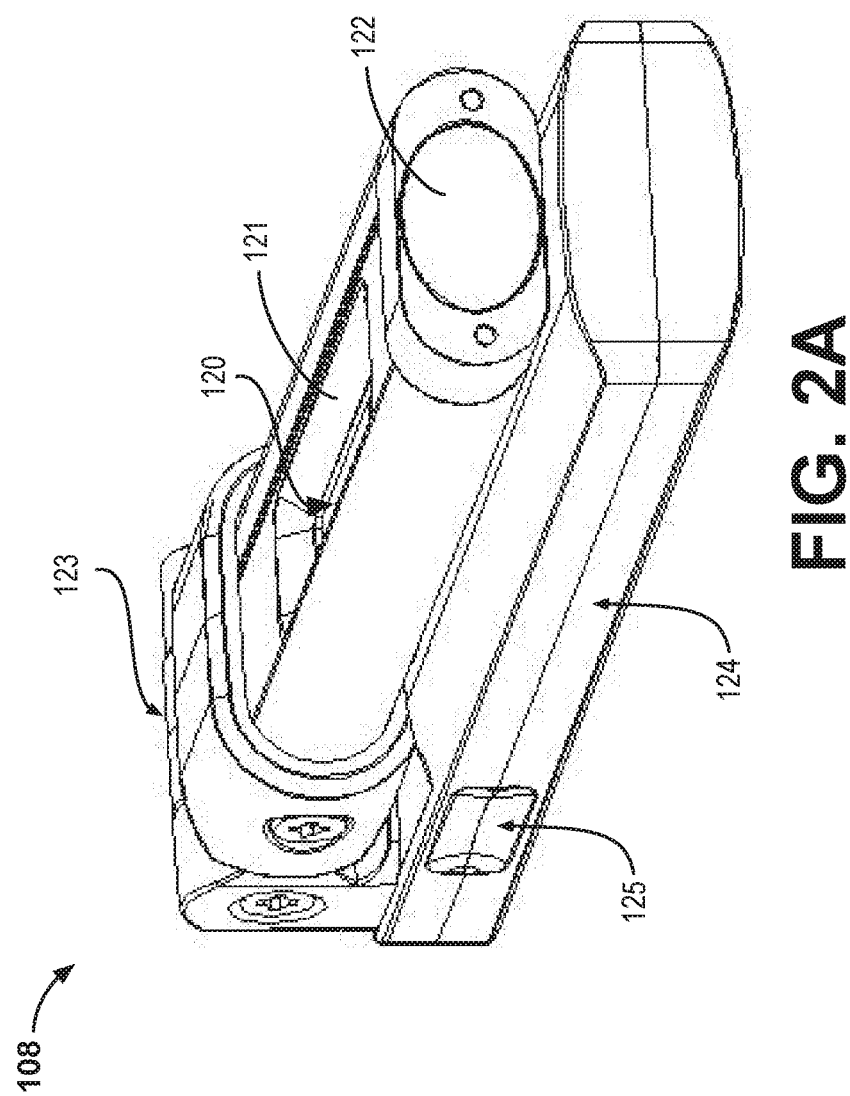
FIG. 2A is a perspective view of a portable foldable lighting apparatus in a closed position, according to an example embodiment.
Figure 2B:
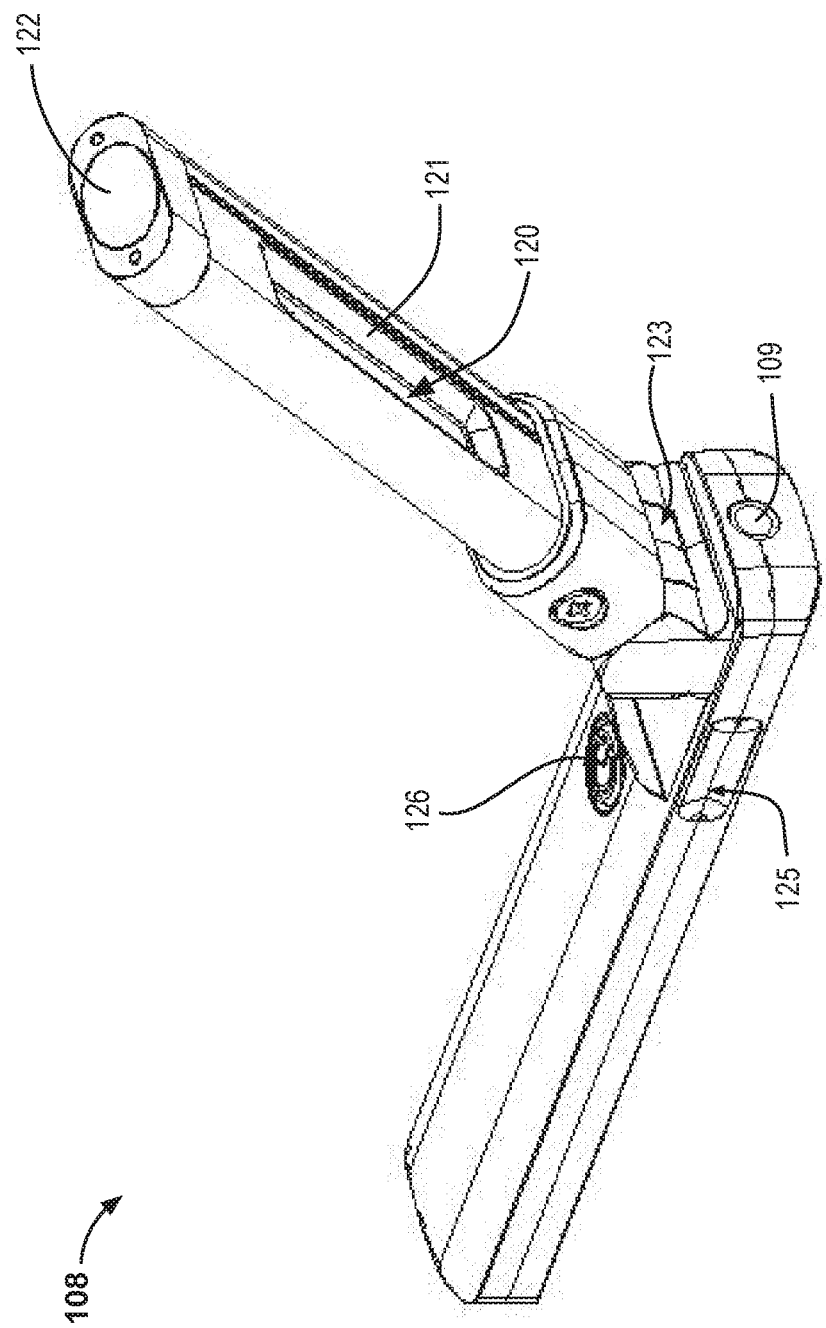
FIG. 2B is a perspective view of a portable foldable lighting apparatus in an open position, according to an example embodiment.
Figure 2C:
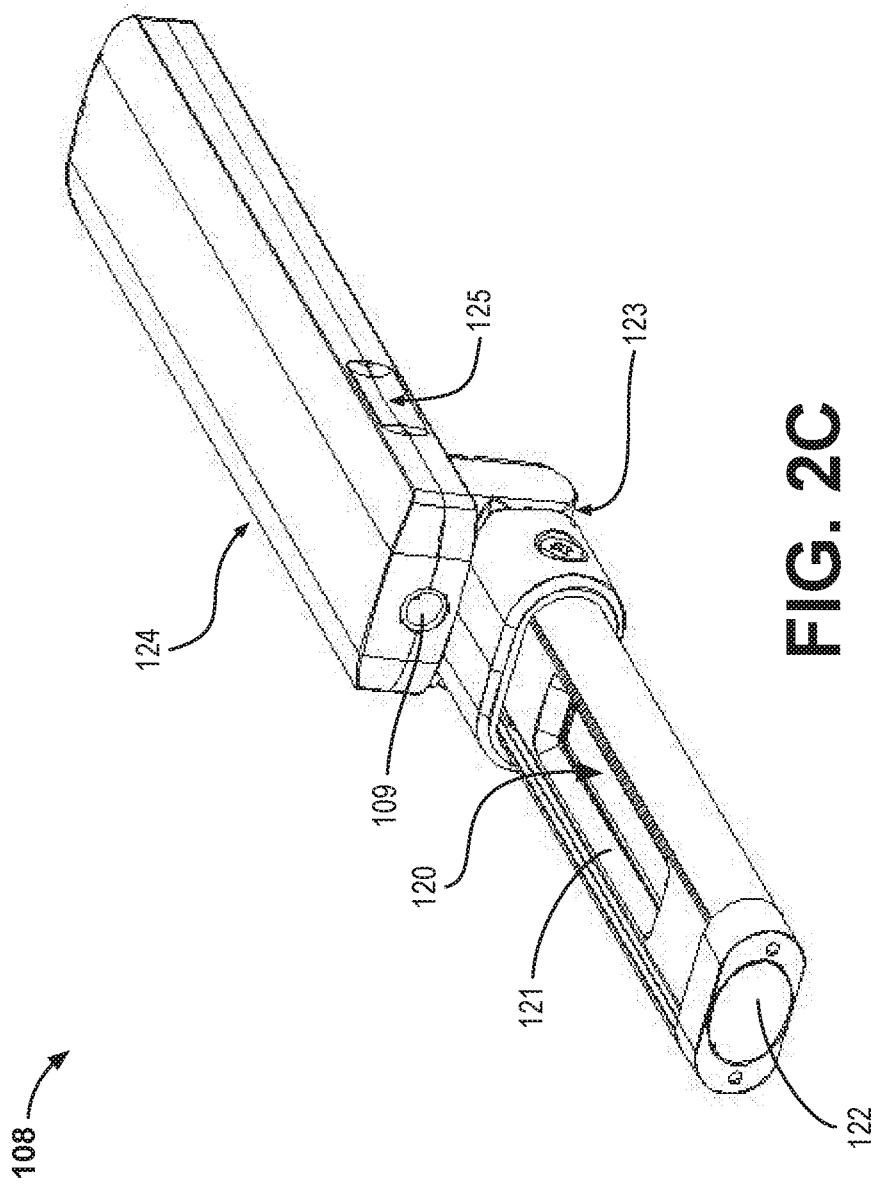
FIG. 2C is a perspective view of a portable foldable lighting apparatus in an open position, according to an example embodiment.

The base 124 further includes thereon a charging port 109, as shown in FIG. 2B and FIG. 2C. The charging port 109 may permit the removable lighting apparatus 108 to be charged independently from the multi-functional lighting apparatus 100. The charging port 109 may also couple to a corresponding plug within receptacle 113 to port power from the multi-functional lighting apparatus 100 to the removable lighting apparatus 108 while the removable lighting apparatus 108 is seated within the receptacle 113.

The rotatable member may rotate about hinge 123 with respect to base 124 with a range of motion of 180°, for example. In this manner, the removable lighting apparatus 108 can be configured in an open position (such that hinge 123 is positioned in between the respective distal ends of the rotatable member and the base 124) and a closed position (such that hinge 123 is positioned at one of end of the removable lighting apparatus 108).

It should be understood that multi-functional lighting apparatuses and removable lighting apparatuses of the present disclosure may include additional elements or components not explicitly shown or described herein. For example, LED devices often include circuitry for driving the LEDs, powering the LEDs, dissipating heat produced by the LEDs or resistive elements electrically coupled to the LEDs, switches or other devices for turning the LEDs on and off, circuit elements for dimming or adjusting the brightness of the LEDs, and/or any other circuit or control element.

Although certain example methods and apparatus have been described herein, the scope of coverage of this disclosure is not limited thereto. On the contrary, this disclosure covers all methods, apparatus, and articles of manufacture fairly falling within the scope of the appended claims either literally or under the doctrine of equivalents.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A portable lighting apparatus comprising:
   an elongated housing having a radially-central cavity extending longitudinally along the elongated housing and a receptacle;

one or more light emitting diodes (LEDs) affixed to a surface of the elongated housing and operable to emit light;
one or more rods operable to extend coaxially from the radially-central cavity;
one or more hooks coupled to distal ends of the respective one or more rods;
a first battery operable to power the one or more LEDs and second battery operable to power the at least one LED mounted on the surface of the rotatable member; and
a foldable lighting apparatus configured to be removably coupled to the receptacle; comprising a base member, a rotatable member coupled to the base member via a hinge, and at least one of the LEDs mounted on a surface of the rotatable member,
wherein the receptacle includes one or more first power terminals, wherein the foldable lighting apparatus further includes one or more second power terminals that are electrically coupled with the one or more first power terminals when the foldable lighting apparatus is coupled to the receptacle, and wherein the second battery is adapted to receive power when the foldable lighting apparatus is coupled to the receptacle.

2. The portable lighting apparatus of claim 1, further comprising:
a charging port operable to receive power from a power source, wherein the charging port is configured to supply power to the battery.

3. The portable lighting apparatus of claim 1, further comprising:
a photoluminescent coating covering at least a portion of the surface of the elongated housing, wherein the photoluminscent coating is adapted to emit light for a duration of time after being irradiated by a light source.

4. The portable lighting apparatus of claim 1, wherein the foldable lighting apparatus further comprises:
a photoluminescent coating covering at least a portion of the surface of the rotatable member, wherein the photoluminscent coating is adapted to emit light for a duration of time after being irradiated by a light source.

5. The portable lighting apparatus of claim 1, wherein the foldable lighting apparatus further comprises:
a button situated on a surface of the base member, wherein the button selectively energizes the at least one LED.

6. The portable lighting apparatus of claim 1, wherein the surface of the rotatable member is a first surface, wherein the first surface is at an end of the rotatable member opposite to the hinge, wherein the at least one LED is a first LED, and wherein the foldable lighting apparatus further comprises:
a second LED mounted on a second surface of the rotatable member.

7. The portable lighting apparatus of claim 6, wherein the foldable lighting apparatus further comprises:
a photoluminescent coating covering at least a portion of the second surface of the rotatable member, wherein the photoluminscent coating is adapted to emit light for a duration of time after being irradiated by a light source.

8. The portable lighting apparatus of claim 1, wherein the foldable lighting apparatus further comprises:
one or more depressions on one or more respective surfaces of the base member.

9. The portable lighting apparatus of claim 1, wherein the rotatable member of the foldable lighting apparatus is formed from metal and adapted to dissipate heat produced by the at least one LED.

10. The portable lighting apparatus of claim 1, wherein each of the one or more hooks is substantially triangular in shape.

11. The portable lighting apparatus of claim 1, wherein each of the one or more hooks is rotatably coupled to the respective one or more rods.

12. The portable lighting apparatus of claim 1, wherein each of the one or more hooks is detachably coupled to the respective one or more rods.

13. The portable lighting apparatus of claim 1, wherein the one or more LEDs are surface mount device (SMD) LEDs.

14. The portable lighting apparatus of claim 1, wherein the one or more LEDs are chips on board (COB) LEDs.

15. A foldable lighting apparatus adapted to be removably coupleable with a receptacle on a portable lighting apparatus with one or more LED affixed to a surface of the elongated housing and operable to emit light, wherein the foldable lighting apparatus comprises:
a base member;
a rotatable member coupled to the base member via a hinge;
at least one LED mounted on a surface of the rotatable member;
a photoluminescent coating covering at least a portion of the surface of the rotatable member, wherein the photoluminscent coating is adapted to emit light for a duration of time after being irradiated by a light source; and
a first battery operable to power the at least one LED mounted on the surface of the rotatable member;
wherein the receptacle includes one or more first power terminals connected to the first battery, wherein the foldable lighting apparatus further includes one or more second power terminals that are electrically coupled with the one or more first power terminals when the foldable lighting apparatus is coupled to the receptacle, and wherein the first battery is adapted to receive power when the foldable lighting apparatus is coupled to the receptacle.

16. A portable lighting apparatus comprising:
an elongated housing having a radially-central cavity extending longitudinally along the elongated housing and a receptacle;
one or more light emitting diodes (LEDs) affixed to a surface of the elongated housing and operable to emit light;
one or more rods operable to extend coaxially from the radially-central cavity;
one or more hooks detachably coupled to distal ends of the respective one or more rods, wherein the one or more hooks are rotatable with respect to the respective one or more rods;
a first battery operable to power the one or more LEDs;
a receptacle on the elongated housing; and
a foldable lighting apparatus adapted to removably couple with the receptacle, wherein the foldable lighting apparatus comprises:
a base member;
a rotatable member coupled to the base member via a hinge;
at least one LED mounted on a surface of the rotatable member and
a second battery operable to power the at least one LED mounted on the surface of the rotatable member,
wherein the receptacle includes one or more first power terminals, wherein the foldable lighting apparatus further includes one or more second power terminals that are electrically coupled with the one or more first power terminals when the foldable lighting apparatus is coupled to the receptacle, and wherein the second battery is adapted to receive power when the foldable lighting apparatus is coupled to the receptacle.

* * * * *